Figure 9:
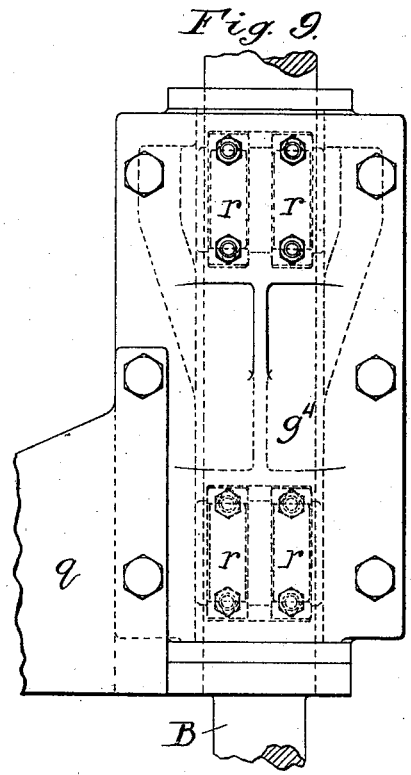

(No Model.)  5 Sheets—Sheet 1.
G. W. VAN TINE.
MOLDING PRESS.
No. 568,819.  Patented Oct. 6, 1896.
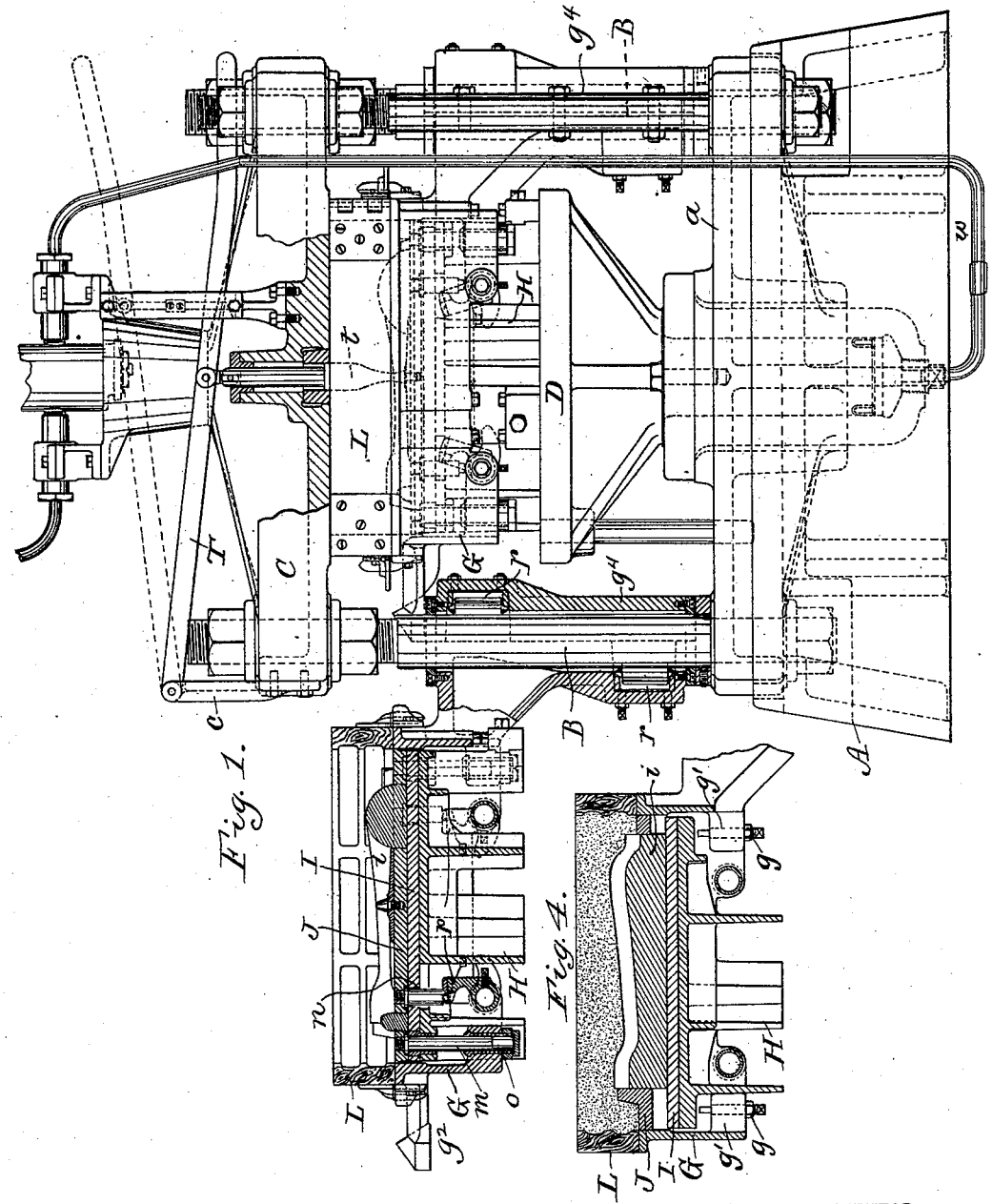
WITNESSES:
INVENTOR:
Geo. W. Van Tine,
BY
ATTORNEY.

(No Model.)  5 Sheets—Sheet 2.
G. W. VAN TINE.
MOLDING PRESS.
No. 568,819. Patented Oct. 6, 1896.
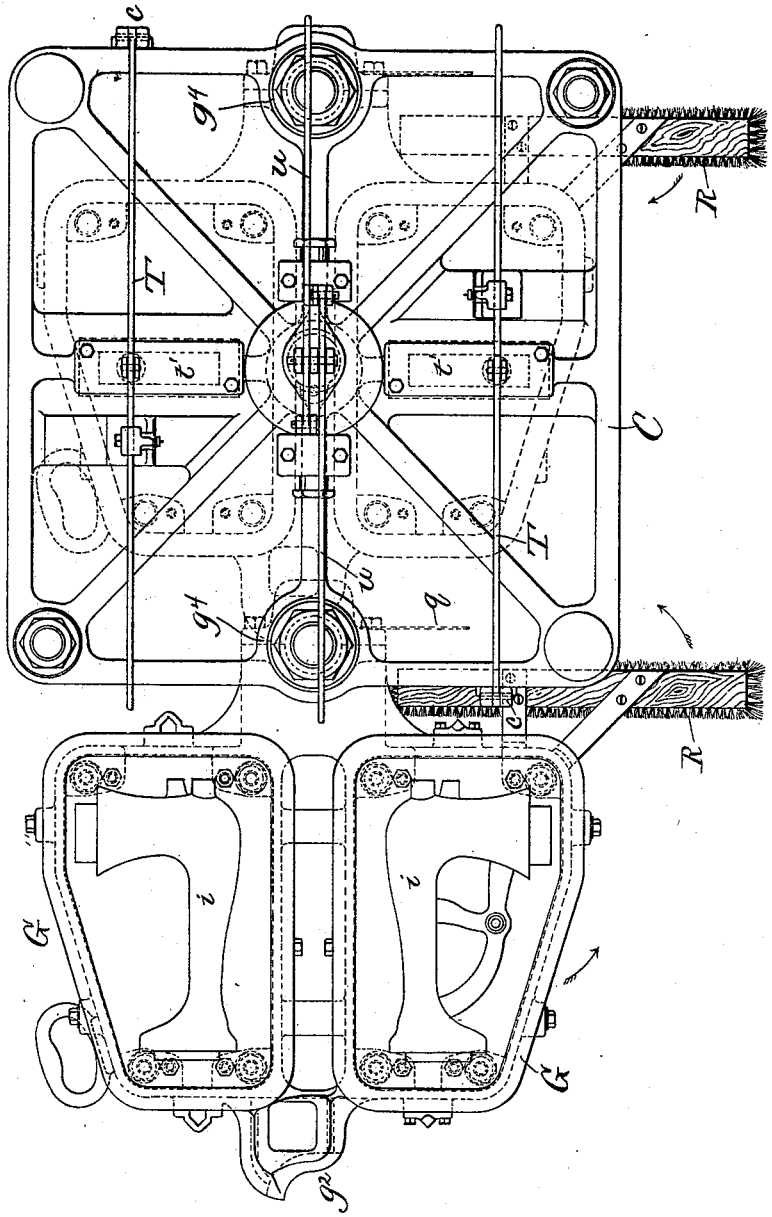
WITNESSES:
C. M. Sweeney
INVENTOR:
Geo. W. Van Tine,
BY Henry Calver
ATTORNEY.

(No Model.)
G. W. VAN TINE.
MOLDING PRESS.
No. 568,819.
5 Sheets—Sheet 3.
Patented Oct. 6, 1896.
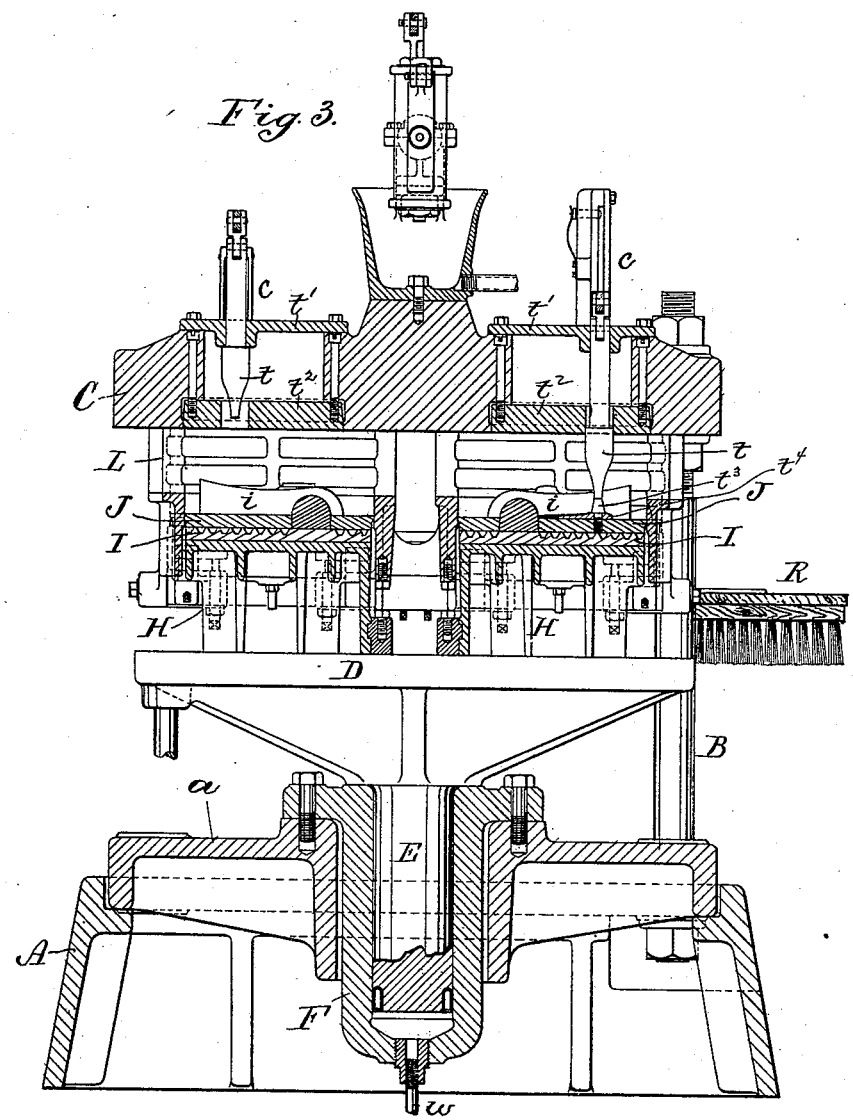
WITNESSES:
C. M. Sweeney
INVENTOR:
Geo. W. Van Tine,
BY Henry Calvert,
ATTORNEY.

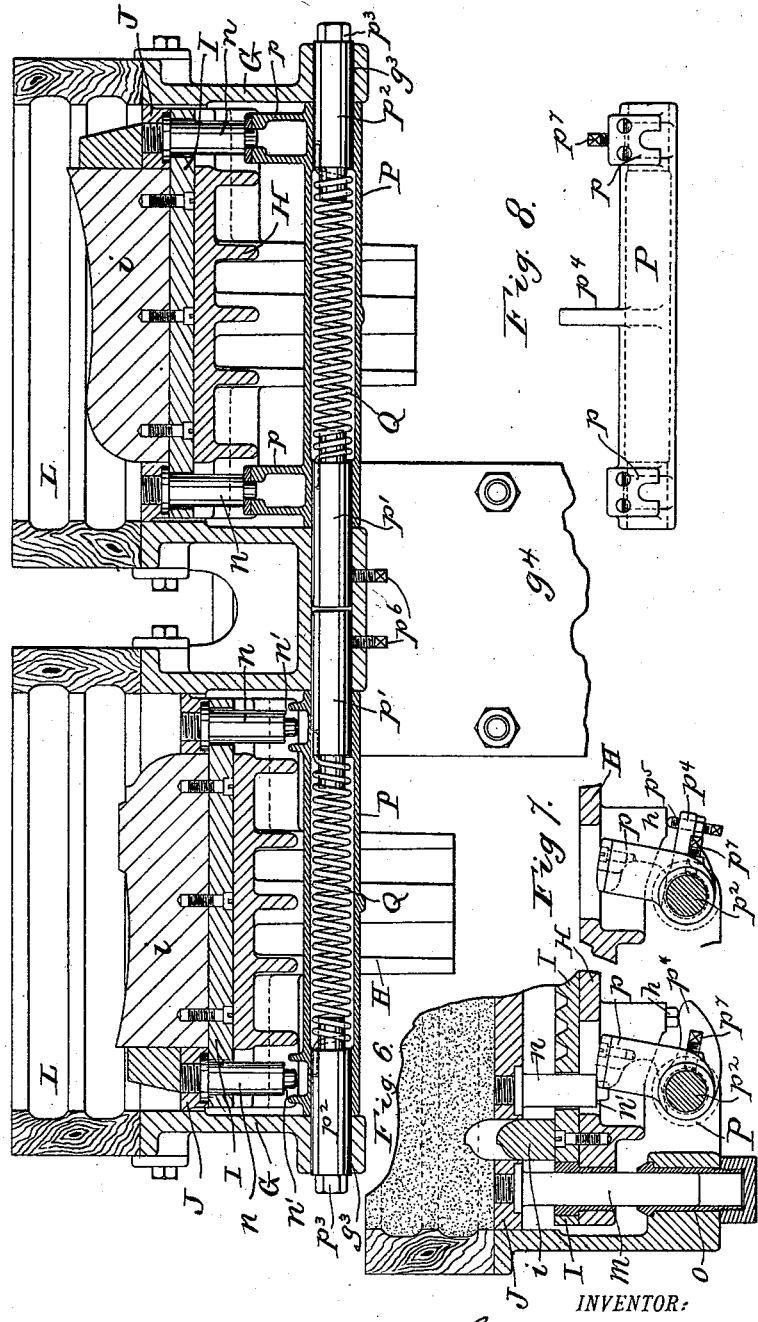

(No Model.) 5 Sheets—Sheet 5.

G. W. VAN TINE.
MOLDING PRESS.

No. 568,819. Patented Oct. 6, 1896.

WITNESSES:

INVENTOR:
Geo. W. Van Tine,
BY
Henry Calvert,
ATTORNEY.

UNITED STATES PATENT OFFICE.

GEORGE W. VAN TINE, OF BAYONNE, NEW JERSEY.

MOLDING-PRESS.

SPECIFICATION forming part of Letters Patent No. 568,819, dated October 6, 1896.

Application filed October 25, 1893. Serial No. 489,124. (No model.)

*To all whom it may concern:*

Be it known that I, GEORGE W. VAN TINE, a citizen of the United States, residing at Bayonne, in the county of Hudson and State of New Jersey, have invented certain new and useful Improvements in Molding-Presses, of which the following is a specification, reference being had therein to the accompanying drawings.

My invention relates to an apparatus or press for use in making molds for metal-founding, and has for its object to provide a molding-press of such construction that it may be operated with ease and rapidity, the arrangements of parts being such that the patterns may be removed from the compressed or molded sand quickly and yet in such a manner as not to disturb or injure the molds which have been made.

In carrying my invention into effect I provide two swinging sand-boxes, which are hinged or pivoted to the standards of the press in such a manner that they may be swung into position between the press-head and press-platen when the patterns are to be pressed into the sand, and may be readily swung outward when the half-flasks are to be removed and new half-flasks and supplies of sand are to be furnished for repeating the molding operation. These swinging sand-boxes are arranged to be operated independently of each other from opposite sides of the press, one being swung outward to be furnished with sand and half-flasks, and during the time the outwardly-swung box is being filled and furnished with half-flasks the other is swung inward beneath the press-head and above the press-plunger for the pressing operation, and thus the said sand-boxes may be alternately brought into use, thereby enabling a single press to do double duty. Each swinging sand-box is preferably made double, so as to carry two sets of patterns and two half-flasks, which are subsequently placed together in the usual manner. If the patterns are deep ones, stripping-plates are provided to support the sand of the mold while the patterns are withdrawn therefrom, and the stripping-plates are withdrawn from the molded sand subsequent to the withdrawal of the patterns, this operation being effected automatically by providing latchment devices to hold up the stripping-plates while the patterns are withdrawn, the latches of said latchment devices being subsequently released to permit the stripping-plates to descend by gravity, and air or other cushions being provided to prevent any such jars by the descending or falling stripping-plates as might injure the molds.

To lessen friction and render the movements of the swinging sand-boxes easy, roller-bearings for the sleeves carrying the sand-boxes are preferably employed, and the bearing-boxes of said rollers are preferably made adjustable to provide means for compensating for wear and to enable the swinging sand-boxes to be leveled up when necessary. To form sprues in the sand while the sand-boxes are in pressing position, I provide the press-head with vertically-movable sprue-pins operated by hand-levers, and to keep the press-platen and the press-table clear of sand, which is more or less scattered or spilled during the filling operation, sand-removing devices, (in the form of brushes or scrapers or both,) movable with the swinging sand-boxes, are provided.

Figure 10:
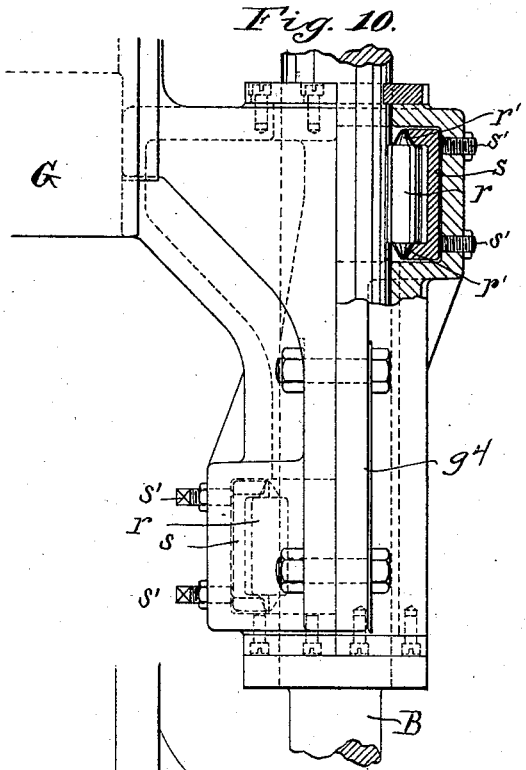
Figure 11:
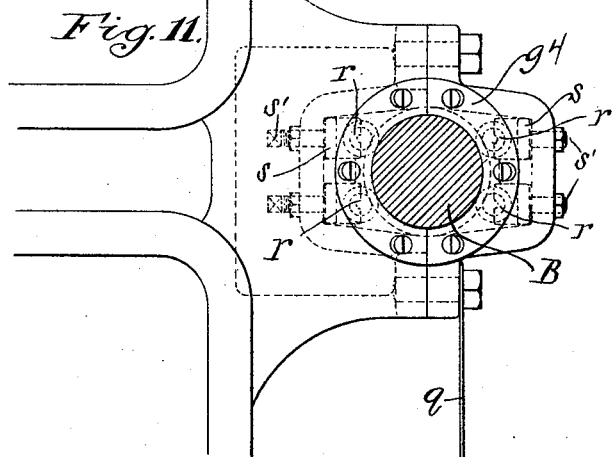

In the accompanying drawings, Figure 1 is a side elevation, partly in section, of my improved molding-press. Fig. 2 is a plan view, and Fig. 3 is a cross-section, of the same. Figs. 4, 5, 6, 7, and 8 are sectional and detail views of the sand-boxes and their latches, and Figs. 9, 10, and 11 are detail views of the sleeves supporting the swinging sand-boxes and their bearings.

A denotes the base of the press, B the standards thereof, and C the press-head supported by said standards. Resting on the base A is a table $a$, which serves as a support for the ram-cylinder F, in which fits the plunger E, which latter is surmounted by the platen D. The press is to be operated by any suitable fluid, water being preferably employed.

Pivoted to the standards B, by means of sleeves $g^4$, are the sand-boxes G, each sand-box being preferably made double, so as to accommodate two half-flasks L, in each of which half of a mold is formed, the half-molds made in the two half-flasks when put together making the complete mold. The swinging double sand-boxes are preferably provided with stops $g^2$ to abut against the standards B and thus limit their movements when said sand-boxes are swung inward to pressing position, and stops to limit their outward swinging movements will also, in practice, preferably be employed.

The swinging supports or tables carrying the double sand-boxes G are movable independently of each other, so that one can be swung in and out of the press while the other remains at rest, thus giving more time for removing the molds and refilling the sand-boxes at one side of the press than would be afforded were the said boxes connected and movable together, so that one would be swung into the press while the other was being swung out, and vice versa.

The sand-boxes G are provided with pressure devices, consisting, preferably, of blocks H, fitted to slide vertically therein, the pattern-plates I, carrying the patterns $i$, resting on or being attached to the said pressure devices or blocks. The pressure-blocks H are preferably of cast-iron, made in skeleton form for lightness. Placed above the pattern-plates I are the stripping plates or templets J, formed with openings through which the patterns carried by the pattern-plates project. The stripping-plates are provided with two sets of depending projections or legs $n$ and $m$, the legs $m$ fitting rather closely in air-chambers or dash-pots $o$, carried by the sand-boxes G. The fit between the legs $m$ (which serve as pistons) and the interiors of the air-chambers $o$, while not air-tight, is close enough to prevent the sudden escape of the air from said chambers when the stripping-plates descend after being tripped, as will presently be described, and thus the air, escaping slowly, will serve to cushion the stripping-plates in their descent, and sudden jars, which might injure the molds, are thereby avoided. Coil-springs of suitable lightness placed in the chambers $o$ might be employed instead of air to cushion the stripping-plates, if desired, but I prefer the air-cushions.

To permit the quantity of sand which is to be placed in the sand-boxes to be varied, the said sand-boxes are preferably provided with regulating-screws $g$, tapped in the lower flanges $g'$ of the sand-boxes, said screws serving as adjustable stops to limit the downward movements of the pressure tables or blocks H. (See Fig. 4.)

The stripping-plates are moved upward with the pattern-plates, but are permitted to descend or are withdrawn from the molded sand after the pattern-plates have been withdrawn, thus preventing any injury to the molds by the withdrawal of the patterns; and to effect this result I prefer to employ spring-actuated latches $p$, coöperating with the depending projections or legs $n$ on the stripping-plates. The latches $p$ are carried by rockers preferably formed as sleeves P, mounted for partial rotation on studs $p'$, attached to the sand-boxes G by set-screws $p^6$, said sleeves having secured to their opposite ends, by set-screws $p^7$, studs $p^3$, provided with turning-nuts $p^3$, the said studs $p^2$ turning in sockets $g^3$ on the sand-boxes G. Torsional springs Q, attached at their opposite ends to the studs $p'$ $p^2$, (one of which is fixed,) normally force the latches $p$ against the legs or projections $n$, the latter being reduced at their lower ends to form the shoulders $n'$. Thus when the stripping-plates are lifted in the pressing operation the latches $p$ fall beneath said shoulders and so serve to hold the stripping-plates elevated after the pressure-blocks H and the pattern-plates carried thereby have nearly reached the limit of their downward movement, at which time adjustable screws or projections $h$ on the pressure-blocks come in contact with arms or lugs $p^4$ on the sleeves P, (or with adjustable screws or projections $p^5$, carried by the arms or lugs $p^4$, as shown in Fig. 7,) thus turning said sleeves slightly and releasing the latches $p$ from the shoulders $n'$, leaving the stripping-plates free to descend by gravity, the fall of said stripping-plates being softened by the air-cushions beneath the legs $m$, afforded by the air-chambers or dash-pots $o$. The tension of the springs Q may be adjusted, when the set-screws $p^6$ are loosened, by a wrench applied to the turning-nuts $p^3$, the said set-screws being again tightened to secure the studs $p^2$ to the sleeves P, thus restoring the operative relation of the parts after adjustment.

To lessen the friction between the standards B and the sleeves $g^4$ incidental to the outward and inward swinging of the sand-boxes G, I prefer to provide said sleeves, near their tops and bottoms, with oppositely-arranged roller-bearings $r$, having conical ends $r'$ fitting in recesses formed in bearing-boxes $s$, the latter being preferably adjustable by means of screws $s'$, so as to provide means for compensating for wear and to enable the said boxes G to be leveled up when necessary. Each series of rollers $r$ extends but part way around a standard B or is but a partial circumferential series, so that one series of rollers will act or may be adjusted in opposition to each other. (See Figs. 10 and 11.)

To form the sprues in the sand before the pressing operation, I provide vertically-movable sprue-pins $t$, operated by hand-levers T, pivoted to standards $c$ on the press-head C. These sprue-pins are guided vertically in plates $t'$ $t^2$, which are preferably removable, so as to be interchangeable with other suitable plates to permit the positions of the sprue-pins to be varied relative to the molds, thus enabling the sprues to be placed wherever the requirements of the mold may demand. Coöperating with the sprue-pins $t$, mounted on the press-head, I employ, in some instances, other sprue projections or pins $t^3$, attached to the gate $t^4$ on the stripping-plates J or to other suitable supports within the sand-boxes.

Attached to the sand-boxes so as to be movable therewith are brushes R, which sweep over the platen D as the sand-boxes are swung in and out, thus keeping the latter clear of sand, which becomes more or less spilled during the operation of filling the sand-boxes; and to keep the table $a$, adjacent to the sleeves $g^4$, clear of sand scrapers or scraping-plates $q$, sweeping or scraping over said table, are attached to the lower parts of said sleeves.

Instead of the brushes R it is obvious that scraping-plates might be employed, or brushes might be used instead of the scraping-plates $q$.

In the operation of my improved press a sand-box, with its appurtenances, is swung outward, as shown at the left of Figs. 1 and 2, and the half-flasks are then placed thereon and sand is supplied to fill the half-flasks level full. The filled sand-box, with its half-flasks, is then swung around beneath the press-head and one of the valve-levers $u$ is operated to admit the pressure fluid or liquid to the press-cylinder F, through the pipe $w$, to lift the platen D and press-blocks H to force all of the sand upward into the half-flasks and at the same time force the patterns into the compacted sand, thus forming the half-molds, the relative positions of the parts at the end of the pressing operation being shown at the right of Fig. 5. Before the pressing operation, however, the hand-levers T are operated to force the sprue-pins $t$ down into the molds to form the sprues, and after the pressing operation the valve-lever $u$ is reversely operated to permit the pressure fluid to be discharged from the press-cylinder, so that the platen, press-blocks, and patterns now descend, the stripping-plates (when such are used) remaining elevated to hold up the molded sand while the patterns are withdrawn therefrom until the pattern-plates have nearly reached the limit of their downward movement, when the projections $h$ on the pressure-blocks come in contact with the arms or lugs $p^4$ or projections carried by the latter (see Figs. 6 and 7) and withdraw the latches $p$ from the shoulders $n'$ of the legs $n$, leaving the stripping-plates free to descend by gravity, as hereinbefore described. The sand-box is next swung outward for the removal of the molds and to be refilled, and while this is being done the sand-box on the opposite side of the press (which in the meantime has been supplied with sand and half-flasks) is subjected to the pressing operation, the work being continued by two sets of workmen, the independently-movable sand-boxes being thus alternately swung into pressing and filling positions.

One great advantage secured by my improved molding-press is the rapidity with which it can be operated, owing to the very short pressing stroke required, the vertical movements of the press-platen and pressure-blocks, to impress the patterns into the sand and force the latter from the sand-boxes into the half-flasks, being in practice only about two inches for ordinary work.

I do not wish to be understood as limiting my invention to all of the details herein shown and described, as these may in many particulars be widely varied without departing from the spirit of my invention. Thus instead of employing a plurality of swinging sand-boxes, horizontally movable independently of each other and each carrying vertically-movable press-blocks and patterns, only one swinging sand-box with its appurtenances might be used when a press to be operated only by one set of men was required.

Having thus described my invention, I claim and desire to secure by Letters Patent—

1. In a molding-press, the combination with a swinging sand-box hinged to a standard of the said press, of a pressure device carried by and horizontally movable with the said sand-box or its support and vertically movable therein, a pattern supported by said pressure device, a stripping-plate, a latchment device for retaining said stripping-plate in an elevated position when the pattern is withdrawn from the sand, and means, movable with said pattern, for automatically releasing the latchment device, to permit the stripping-plate to descend after the pattern has been lowered.

2. The combination, with a molding-press, of swinging sand-boxes hinged to the opposite side standards of the press, and movable in and out of the press independently of each other, and vertically-movable pressure-blocks and patterns carried by and horizontally movable with the said sand-boxes or their supports.

3. In a molding apparatus, the combination with a sand-box and a pressure device vertically movable therein, of a pattern supported by said pressure device, a stripping-plate, a latchment device for retaining said stripping-plate in an elevated position while the pattern is withdrawn from the sand, and means, movable with said pattern, for automatically releasing the latchment device, to permit the stripping-plate to descend after the pattern has been lowered.

4. In a molding apparatus, the combination with a sand-box and a pressure block or device vertically movable therein, of a pattern movable with said pressure device, a stripping-plate, spring-pressed latches for retaining said stripping-plate in an elevated position while the pattern is withdrawn from the sand, and means, movable with said pressure device and pattern, for automatically releasing said latches, to permit of the descent of the stripping-plate, after the pattern has been lowered.

5. In a molding apparatus, the combination with a sand-box and a pressure device and pattern vertically movable therein, of a stripping-plate also vertically movable in said sand-box but independently of said pattern, a latchment device for retaining the stripping-plate in contact with the molded sand after the pattern has been withdrawn therefrom, and means, movable with said pattern, for automatically releasing said latchment device to permit of the withdrawal of the stripping-plate subsequent to the withdrawal of the pattern.

6. In a molding apparatus, the combination with a sand-box and a pressure device and pattern vertically movable therein, of a stripping-plate, a latchment device for retaining said stripping-plate in an elevated position while the pattern is being withdrawn from the molded sand, means, movable with said pattern, for automatically releasing said latchment device, to permit the stripping-plate to descend after the pattern has been lowered, and cushioning means to soften the descent of the stripping-plate and prevent injury to the mold by jars incidental to the fall of said stripping-plate.

7. In a molding apparatus, the combination with a sand-box, of a pressure block or device vertically movable therein, a pattern above said pressure block or device, the stripping-plate J having depending legs or projections $n$ provided with shoulders, spring-pressed latches $p$ arranged to engage said shoulders when the stripping-plates are lifted, and disengaging devices vertically movable independently of said stripping-plates and serving to release said latches from said shoulders, and thus permit of the descent of the stripping-plates subsequent to the withdrawal of the patterns from the molded sand.

8. In a molding apparatus, the combination with a sand-box, as G, provided with air-cushioning dash-pots $o$, of a pressure device, a pattern and a stripping-plate all vertically movable in said sand-box, a latchment device to retain said stripping-plate elevated while the pattern is withdrawn from the sand, and means for releasing said latchment device after the pattern has descended, said stripping-plate being provided with pins or legs $m$ closely fitting in said dash-pots and forming pistons, to operate substantially as described.

9. In a molding apparatus, the combination with a sand-box, as G, of a pressure block or device, a pattern, and a stripping-plate all vertically movable in said sand-box, said pressure block or device having projections and said stripping-plate having depending legs $n$ provided with shoulders $n'$, the rockers P pivotally supported from said sand-box and having arms or latches $p$ and disengaging lugs or arms $p^4$, the latter arranged to be engaged by said projections on said pressure block or device, and springs for operating said rockers to hold said arms or latches $p$ in contact with the said legs $n$ on the stripping-plate.

10. In a molding-press, the combination with a swinging sand-box hinged to the standard of the press, of a sand-removing device movable with said sand-box and arranged to sweep over the press-platen when the said box is swung in and out of the press.

11. In a molding-press, the combination with a swinging sand-box provided with a pivoting-sleeve surrounding a standard of the press, of a sand-removing device attached to said sleeve and arranged to sweep over that part of the press-table which is adjacent to said sleeve when the said sand-box is swung in and out of the press, and thus keep the press-table clear of sand.

12. In a molding-press, the combination with swinging sand-boxes, of sand-removing devices movable with said sand-boxes and arranged to sweep over the press platen and table when said boxes are swung in and out of the press.

13. In a molding-press, the combination with a standard thereof, of a swinging sand-box provided with a sleeve surrounding said standard, said sleeve being provided near its top and bottom with a partial circumferential series of antifriction rollers or bearings arranged oppositely to each other, and adjustable boxes in which said rollers are mounted.

14. In a molding-press, the combination with sand-boxes which are movable in and out of the press and which are provided with pressure devices and patterns, of vertically-movable sprue-forming pins supported by the cross-head of the press and thus adapted to be plunged into the sand while the sand-boxes are in pressing position, and removable plates or blocks in which said pins are mounted, so that said pins may be changed to vary their positions for different patterns.

15. In a molding-press, the combination with the posts or standards thereof, of swinging sand-boxes hinged to said posts or standards and movable in and out of the press independently of each other, said sand-boxes being provided with stops adapted to come in contact with said posts or standards to thereby limit the inward movements of the said sand-boxes when the latter are swung into pressing position beneath the cross-head of the press.

In testimony whereof I affix my signature in presence of two witnesses.

GEORGE W. VAN TINE.

Witnesses:
HENRY CALVER,
J. F. JAQUITH.